US012786628B2

(12) United States Patent
Palakonda et al.

(10) Patent No.: US 12,786,628 B2
(45) Date of Patent: Nov. 3, 2026

(54) VEHICLE SYSTEM FOR INTERACTIVE AUDIO PLAY

(71) Applicant: FORD GLOBAL TECHNOLOGIES, LLC, Dearborn, MI (US)

(72) Inventors: Sathyanarayana Chary Palakonda, Northville, MI (US); Brian Schabel, Northville, MI (US); Lee Mitchell Tome, Windsor (CA); Ivan Vukovic, Birmingham, MI (US); Jean de Dieu Mutangana, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 18/443,685

(22) Filed: Feb. 16, 2024

(65) Prior Publication Data

US 2025/0267405 A1 Aug. 21, 2025

(51) Int. Cl.

| | |
|---|---|
| ***H04R 3/12*** | (2006.01) |
| ***G06F 3/16*** | (2006.01) |
| ***G06V 40/16*** | (2022.01) |
| *G01S 5/14* | (2006.01) |

(52) U.S. Cl.

CPC ............... *H04R 3/12* (2013.01); *G06F 3/165* (2013.01); *G06V 40/172* (2022.01); *G01S 5/14* (2013.01); *H04R 2430/01* (2013.01); *H04R 2499/13* (2013.01)

(58) Field of Classification Search

CPC .. H04R 3/12; H04R 2430/01; H04R 2499/13; H04R 1/025; G06F 3/165; G06V 40/172; G01S 5/14; H04W 72/23; H04W 4/40; H04W 92/18; B60R 16/0231; B60Q 5/00; H04S 2400/11

See application file for complete search history.

(56) References Cited

U.S. PATENT DOCUMENTS

| | | | | |
|---|---|---|---|---|
| 7,613,313 | B2 * | 11/2009 | Juppi | H04R 27/00 348/169 |
| 8,848,932 | B2 | 9/2014 | Poulsen et al. | |
| 8,867,313 | B1 * | 10/2014 | Rivlin | G01S 11/14 367/118 |
| 9,126,526 | B2 | 9/2015 | Yokoyama et al. | |
| 9,509,820 | B2 * | 11/2016 | Gopinath | H04W 8/005 |
| 9,537,989 | B2 * | 1/2017 | Atkinson | H04B 17/318 |
| 9,706,320 | B2 | 7/2017 | Starobin et al. | |
| 10,046,637 | B2 * | 8/2018 | Buttolo | B60K 35/10 |
| 10,129,643 | B2 * | 11/2018 | Lopez | H04S 7/303 |

(Continued)

FOREIGN PATENT DOCUMENTS

| | | | |
|---|---|---|---|
| CN | 108349423 | A | 7/2018 |
| CN | 113060153 | A | 7/2021 |

(Continued)

*Primary Examiner* — Akelaw Teshale

(74) *Attorney, Agent, or Firm* — Joseph Zane; Brooks Kushman P.C.

(57) ABSTRACT

A vehicle includes one or more wireless transceivers configured to establish one or more wireless communications with a mobile device; a plurality of speakers configured to output an audio; and a controller programmed to measure a location of a user carrying the mobile device within a predefined range from the vehicle using the one or more wireless communications, and adjust a volume of the one or more speakers using the location of the user.

17 Claims, 3 Drawing Sheets

(56) References Cited

U.S. PATENT DOCUMENTS

| | | | | |
|---|---|---|---|---|
| 10,182,138 | B2 * | 1/2019 | Motika | G06F 3/165 |
| 10,373,626 | B2 * | 8/2019 | Krasnov | G10L 21/003 |
| 10,419,868 | B2 * | 9/2019 | Hotary | G06V 20/59 |
| 10,580,291 | B1 * | 3/2020 | Rothenberg | G05D 1/0088 |
| 11,044,566 | B2 * | 6/2021 | Van Wiemeersch | H04W 4/023 |
| 11,202,150 | B1 * | 12/2021 | Hoover | G06V 40/10 |
| 11,245,374 | B2 | 2/2022 | Wahlberg et al. | |
| 11,950,316 | B1 * | 4/2024 | Nalevanko | H04W 4/40 |
| 12,128,881 | B1 * | 10/2024 | Nalevanko | B60W 30/09 |
| 2007/0135061 | A1 * | 6/2007 | Buck | H04M 9/001 455/99 |
| 2014/0329567 | A1 * | 11/2014 | Chan | H04M 1/605 455/569.1 |
| 2016/0165031 | A1 * | 6/2016 | Gopinath | H04W 8/005 455/569.2 |
| 2017/0201610 | A1 * | 7/2017 | Motika | H04M 1/6083 |
| 2018/0124515 | A1 * | 5/2018 | Lopez | G06F 3/165 |
| 2018/0268836 | A1 * | 9/2018 | Krasnov | G10L 21/16 |
| 2019/0199850 | A1 * | 6/2019 | Hannon | G01S 1/75 |
| 2022/0240015 | A1 * | 7/2022 | Helm | H04R 5/02 |
| 2024/0056522 | A1 * | 2/2024 | O'Keeffe | G10L 15/22 |
| 2024/0087339 | A1 * | 3/2024 | Ishida | G06V 20/59 |
| 2024/0109486 | A1 * | 4/2024 | Konno | B60Q 5/006 |

FOREIGN PATENT DOCUMENTS

| | | | |
|---|---|---|---|
| CN | 115967895 | A | 4/2023 |
| DE | 102017131029 | A1 | 6/2018 |
| EP | 3930352 | A1 | 12/2021 |
| KR | 20160143530 | A | 12/2016 |
| WO | 2023072118 | A1 | 5/2023 |
| WO | 2023072120 | A1 | 5/2023 |

* cited by examiner

200

300

VEHICLE SYSTEM FOR INTERACTIVE AUDIO PLAY

TECHNICAL FIELD

The present disclosure generally relates to a vehicle audio system. More specifically, the present disclosure relates to an interactive audio system of a vehicle based on a location of a user.

BACKGROUND

Modern vehicles may be provided with an infotainment system configured to provide video and audio output to one or more vehicle users. Some vehicles may be provided with exterior speakers configured to provide audio output to vehicle users outside the vehicle.

SUMMARY

A vehicle includes one or more wireless transceivers configured to establish one or more wireless communications with a mobile device; a plurality of speakers configured to output an audio; and a controller programmed to measure a location of a user carrying the mobile device within a predefined range from the vehicle using the one or more wireless communications, and adjust a volume of the one or more speakers using the location of the user.

A method for a vehicle includes establishing, via a plurality of transceivers, wireless connections with a mobile device; measuring, via one or more controllers, a location of the mobile device using the wireless connections through trilateration; adjusting, via the one or more controllers, volumes of a plurality of speakers exterior to the vehicle using the location of the mobile device; and outputting, via the plurality of speakers, an audio using the volume.

A non-transitory computer-readable medium includes instruction when executed by a vehicle, cause the vehicle to establish a plurality of wireless connections with a mobile device, wherein at least one of the wireless connections is under an ultra-wide band (UWB) protocol; measure a location of the mobile device exterior to the vehicle by trilaterating the plurality of wireless connections; adjust volumes of a plurality speakers exterior to the vehicle using the location of the mobile device; and output an audio of a playlist at the volumes of the plurality of speakers.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a vehicle audio system. More specifically, the present disclosure proposes a system for adjusting vehicle audio output based on locations of one or more vehicle users at the vicinity of the vehicle.

Figure 1:
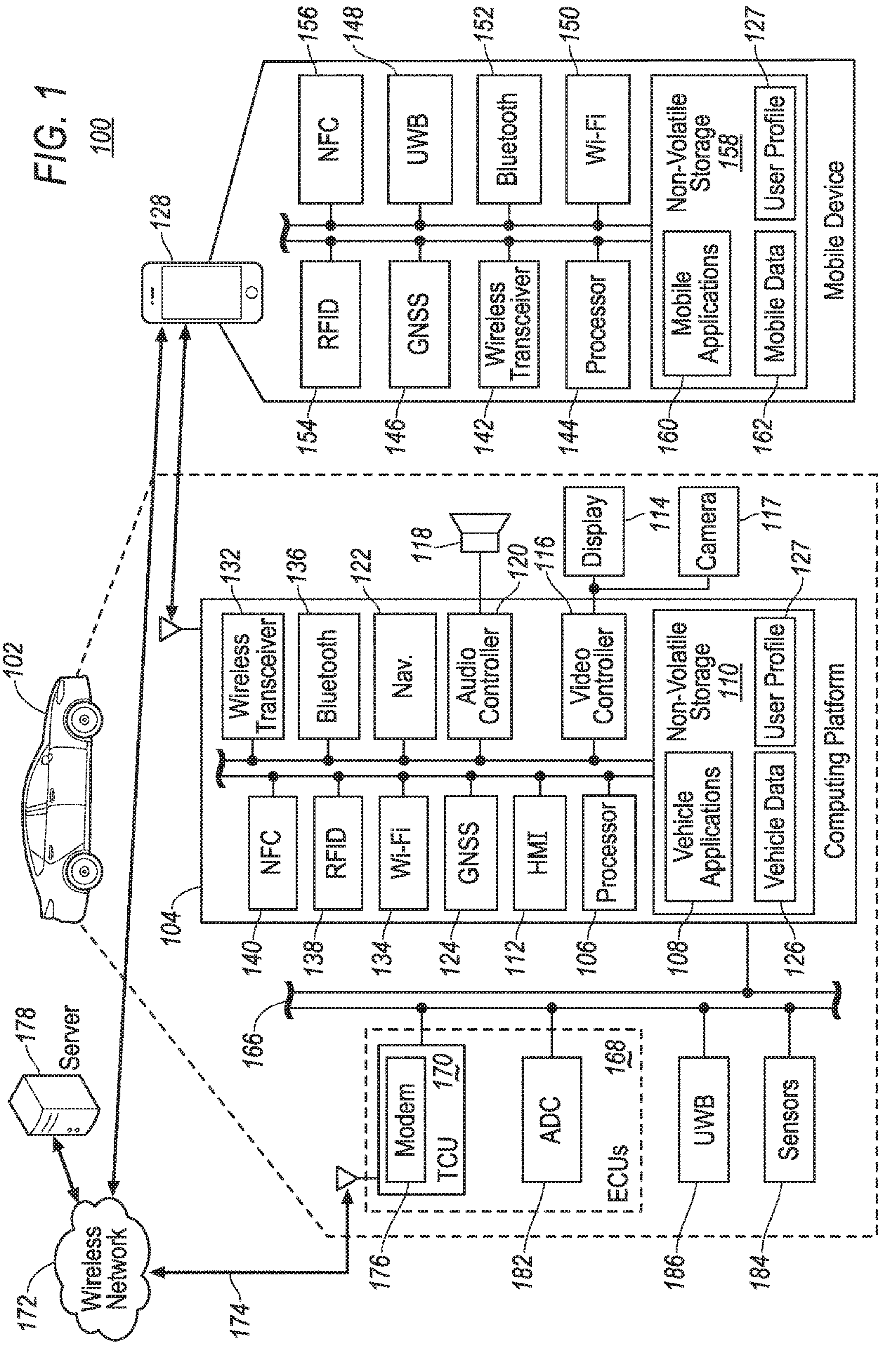
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), a parallel/series hybrid vehicle (PSHEV), or a fuel-cell electric vehicle (FCEV), a boat, a plane or other mobile machine for transporting people or goods. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as multimedia operations, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle users to interface with the computing platform 104. For example, the computing platform 104 may receive input from human machine interface (HMI) controls 112 configured to provide for user interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle users by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more cameras 117 configured to provide visual input to the vehicle 102 by way of the video controller 116. The cameras 117 may include one or more cabin cameras configured to capture images inside the vehicle cabin, and/or one or more exterior cameras configured to capture images outside the vehicle cabin. The computing platform 104 may also drive or otherwise communicate with one or more speakers 118 configured to provide audio output and input to vehicle users by way of an audio controller 120. The speakers 118 may include one or more interior speaker located within the vehicle cabin and configured to play audio sound to vehicle user inside the vehicle 102. Additionally or alternatively, the speakers 118 may include one or more exterior speakers located outside the vehicle cabin and configured to output audio sound to users outside the vehicle 102. For instance, the exterior speakers may be placed and/or integrated with various exterior components of the vehicle 102 at different body locations to provide the audio output to various directions.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The storage 110 may be further configured to store one or more user profiles 127 associated with one or more vehicle users. The user profile 127 may include a variety of information entries associated with the respective vehicle user. For instance, the user profile 127 may be indicative of one or more preselected audio playlist associated with each vehicle user such that the audio playlist may be automatically played responsive to detecting the user is at the vicinity of the vehicle 102. The audio playlist may include one or more audio entries associated with the preference of the respective user. For instance, the audio playlist may include one or more radio channels, podcasts, digital music, white noise that may be output via the one or more speakers 118 of the vehicle 102. The user profile 127 may further include biometric information about the one or more users. As an example, facial images of the users may be stored as a part of the user profile and the computing platform 104 may identify the users based on images captured via the cameras 117.

The computing platform 104 may be configured to wirelessly communicate with a mobile device 128 of the vehicle users via a wireless connection and/or communication. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a GNSS controller 146. The mobile device 128 may be provided with a wireless transceiver 142 in communication with an ultra-wide band (UWB) controller 148, a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162. The storage 158 may be further configured to store the user profile 127 associated with the user associated with the mobile device 128.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, or the like.

The computing platform 104 may be configured to communicate with various electronic control units (ECUs) 168 of the vehicle 102 configured to perform various operations. For instance, the computing platform 104 may be configured to communicate with a telematics control unit (TCU) 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities.

The ECUs 168 may further include an autonomous driving controller (ADC) 182 configured to control autonomous driving features of the vehicle 102. Driving instructions may be received remotely from the server 178. The ADC 182 may be configured to perform the autonomous driving features using the driving instructions combined with navigation instructions from the navigation controller 122.

The vehicle 102 may be provided with various sensors 184 to provide signal input to the computing platform 104 and the ECUs 168. As a few non-limiting examples, the sensors 184 may include one or more ultra-sonic radar sensors and/or lidar sensors to detect object at the vicinity of the vehicle 102.

In addition, the vehicle 102 may be further provided with one or more UWB transceivers 186 configured to communicate with one or more entities using UWB communications. For instance, the vehicle 102 may be configured to communicate with the mobile device 128 via the one or more UWB transceivers 186 in addition to or in lieu of the wireless transceivers 132. When multiple UWB transceivers 186 are provided, the UWB transceivers 186 may be placed at various locations of the vehicle 102 to perform various operations such as determining the location of the connected device via trilateration and/or triangulation.

Figure 2:
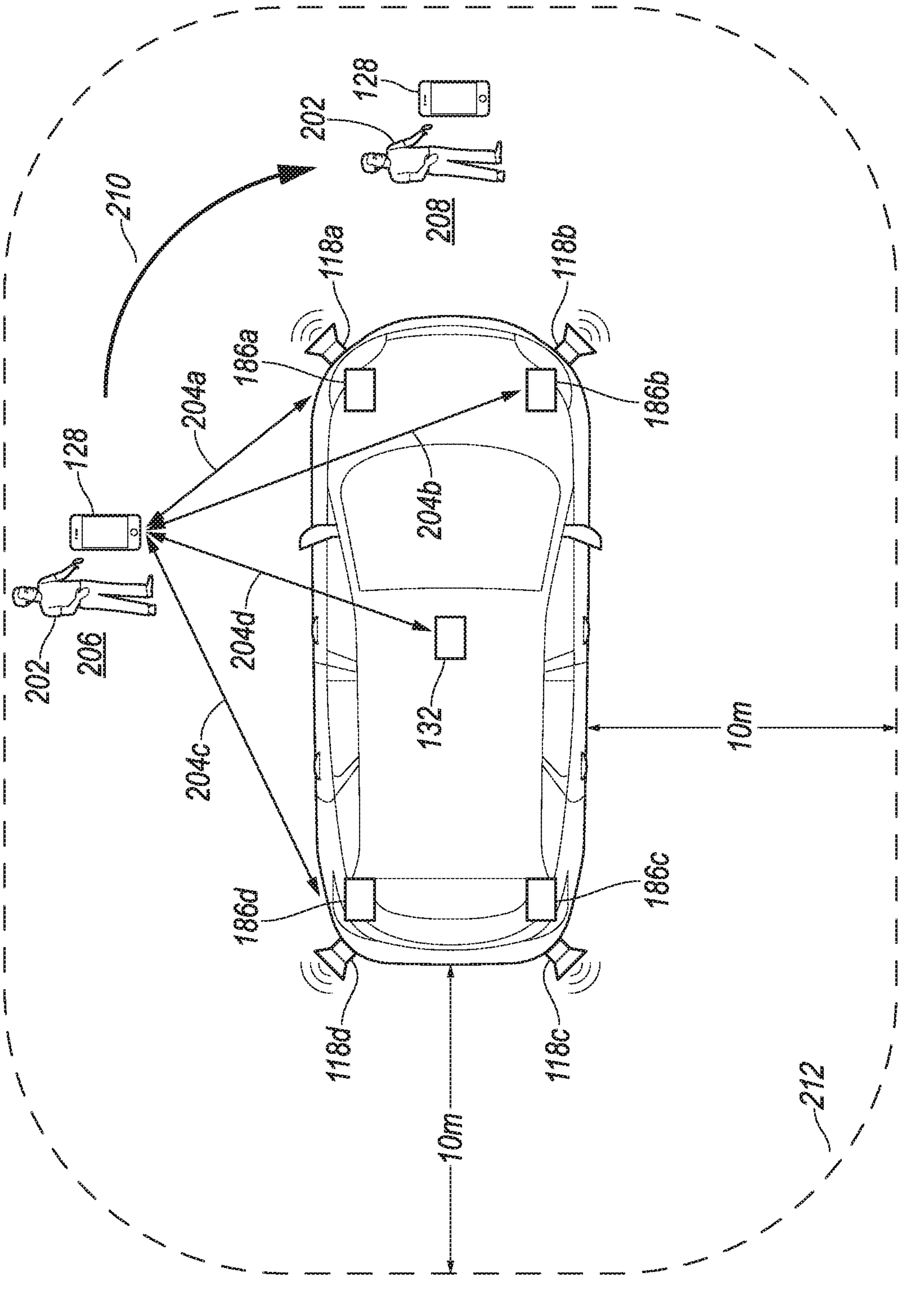
FIG. 2 illustrates an example schematic diagram of the vehicle communication system of one embodiment of the present disclosure.

Referring to FIG. 2, an example schematic diagram 200 of the vehicle communication system of one embodiment of the present disclosure is illustrated. With continuing reference to FIG. 1, the vehicle 102 in the present example may be provided with a plurality of UWB transceivers 186 at various locations of the vehicle 102. For instance, the vehicle 102 may be provided with a first UWB transceiver **186*a* located near a front-left corner of the vehicle 102. The vehicle 102 may be further provided with a second UWB transceiver 186*b* located near a front-right corner of the vehicle 102. The vehicle 102 may be further provided with a third UWB transceiver 186*c* located near a rear-right corner of the vehicle 102. The vehicle 102 may be further provided with a fourth UWB transceiver 186*d* located near a rear-left corner of the vehicle 102. It is noted that locations of the vehicle UWB transceivers 186 in the present example are only for demonstrative purpose and one or more of the UWB transceivers 186 may be provided at different locations of the vehicle 102** such as the rear-view mirrors, front/rear bumper, door panels or the like.

As discussed above, the UWB transceivers 186 may establish UWB wireless connections and/or communications with the mobile device 128 associated with a vehicle user 202 at a given time. Once three or more wireless connections are established, the computing platform 104 may use the timing of each wireless connections to determine the location of the mobile device 128 (and thus the location of the user 202) via trilateration. More specifically, it is assumed that the mobile device 128 is carried by the user 202 in the present example. The mobile device 128 may establish a first wireless connection **204*a* with the first UWB transceiver 186*a* of the vehicle 102. The mobile device 128 may establish a second wireless connection 204*b* with the first UWB transceiver 186*b* of the vehicle 102. The mobile device 128 may establish a third wireless connection 204*c* with the fourth UWB transceiver 186*d* of the vehicle 102. Additionally or alternatively, the mobile device 128 may establish a fourth wireless connection with the wireless transceiver 132 of the vehicle 102**. The fourth wireless connection may be established via wireless communication protocols other than UWB. For instance, the fourth wireless connection may be established via Bluetooth, NFC or the like.

Each of the wireless connections 204 may be associated with an individual time of flight (TOF) indicative of a measurement of time taken by the wireless signal to travel between the mobile device 128 and each respective UWB transceivers 186 and/or wireless transceiver 132. Since the travel speed of the wireless signal is known, the distance between the mobile device 128 and each respective transceiver 186, 132 may be determined based on the TOF. In general, the TOF may be proportional to the distance travel by the UWB signal. E.g., a short TOF may be associated with a shorter distance between the mobile device 128 and the respective transceiver 186, 132, and a longer TOF may be associated with a longer distance between the mobile device 128 and the respective transceiver 186, 132. Once the distance between the mobile device 128 and each respective transceiver 186, 132 is determined, the computing platform 104 may calculate the relative location of the mobile device 128 with reference to the vehicle 102 based on the distances using trilateration and/or triangulation. In the present example, the computing platform 104 may determine the mobile device 128 (and thus the user 202) is at a first location 206 to the left side of the vehicle 102.

The computing platform 104 may continuously monitor the location of the user 202 by updating the trilateration and/or triangulation of the mobile device 128 at a periodical interval (e.g., every 100 ms). For instance, the user 202 may walk from the first location 206 toward the front of the vehicle 102 and stop at the second location 208. The computing platform 104 may measure and track the trajectory 210 of the user 202 accordingly.

As discussed above, the vehicle 102 may be provided with a plurality of exterior speakers 118 at various locations of the vehicle 102. For instance, the vehicle 102 may be provided with a first speaker **118*a* located near a front-left corner of the vehicle 102. The vehicle 102 may be further provided with a second speaker 118*b* located near a front-right corner of the vehicle 102. The vehicle 102 may be further provided with a third speaker 118*c* located near a rear-right corner of the vehicle 102. The vehicle 102 may be further provided with a fourth speaker 118*d* located near a rear-left corner of the vehicle 102. It is noted that locations of the vehicle speakers 118 in the present example are only for demonstrative purpose and one or more of the speakers 118 may be provided at different locations of the vehicle 102** such as the rear-view mirrors, front/rear bumper, door panels, inside the vehicle cabin or the like.

The computing platform 104 may be configured to provide the vehicle user 202 with a consistent audio experience via the plurality of speakers 118 based on the locations of the vehicle user 202 as measured via the wireless connections 204. More specifically, the computing platform 104 may adjusts the volume of one or more of the speakers 118 based on the location of the mobile device 128 such that the user 202 experiences a consistent and smooth audio output from the speakers 118 even if the user 202 is in motion at the vicinity of the vehicle 102. For instance, responsive to detecting the user 202 being at the first location 206 to the left of the vehicle 102 on the driver door side, the computing platform 104 may output the audio sound via the first speaker **118*a* and the fourth speaker 118*d* that are the closest to the user 202. The second speaker 118*b* and the third speaker 118*c* are not in use in this situation since they are farther away from the first location 206. The audio controller 120 of the computing platform 104 may control the volume of the first speaker 118*d* and the fourth speaker 118*d*** using the following equations:

$$\alpha f_1 + (1 - \alpha) f_4 = V \tag{1}$$

wherein V denotes the total volume selected by the user 202, $f_1$ denotes the volume control function for operating the first speaker 118*a*, and $f_4$ denotes the volume control function for operating the fourth speaker 118*d*. α denote a location variable indicative of the location of the user 202 relative to the location of one of the speakers as a reference speaker (e.g., the first speaker 118*a* in the present example). For instance, the speaker 118 that is the closest to the location of the user 202 may be selected as the reference speaker. The location variable a is inversely proportional to the distance between the location of the user 202 and the reference speaker varied between 0 and 1.

For instance, if the location of the user 202 is measured at the front-left corner of the vehicle 102 next to the first speaker (e.g., zero distance), the audio controller 120 may set the location variable a to be 1 (e.g., the maximum) such that the first speaker 118*a* is used to output the entire volume V and no other speakers 118 is used to output the audio sound. In contrast, if the location of the user 202 is at halfway between the first speaker 118*a* and the fourth speaker at an equal distance, the audio controller 120 may set the location variable a to be 0.5 such that both the first speaker 118*a* and the fourth speaker 118*d* outputs a half of the total volume V. In this way, the user 202 may experience a consistent audio volume at various locations at the vicinity of the vehicle 102.

As discussed above, the computing platform 104 may tract the trajectory 210 of the user 202 from the first location 206 to the second location 208 that is in front of the vehicle 102. The audio controller 120 may adjust the audio output volume at various speakers 118 based on the trajectory 210 of the user 202. In the present example, as the user relocates from the first location 206 to the second location 208, the audio controller may gradually reduce the volume of the fourth speaker 118*d* and increase the volume of the second speaker 118*b* such that the user 202 receives a consistent audio experience and smooth transition while in motion on the trajectory 210 from the first location 206 to the second location 208.

The vehicle 102 may be associated with an audio output range 212 defining an area centered around the vehicle 102 that are effectively covered by the one or more speakers 118. Within the audio output range 212, the user 202 may perceive a desired the audio experience from the speakers 118. The audio experience outside the audio output range 212 may be undesirable as the distance between the user 202 and the closest one of the speakers 118 is too far. If the computing platform detects the user 202 has exited the audio output range 212, the audio controller 120 may suspend the audio output until the user reenters the audio output range 212. In one example, the audio output range 212 may be 10 meters.

Figure 3:
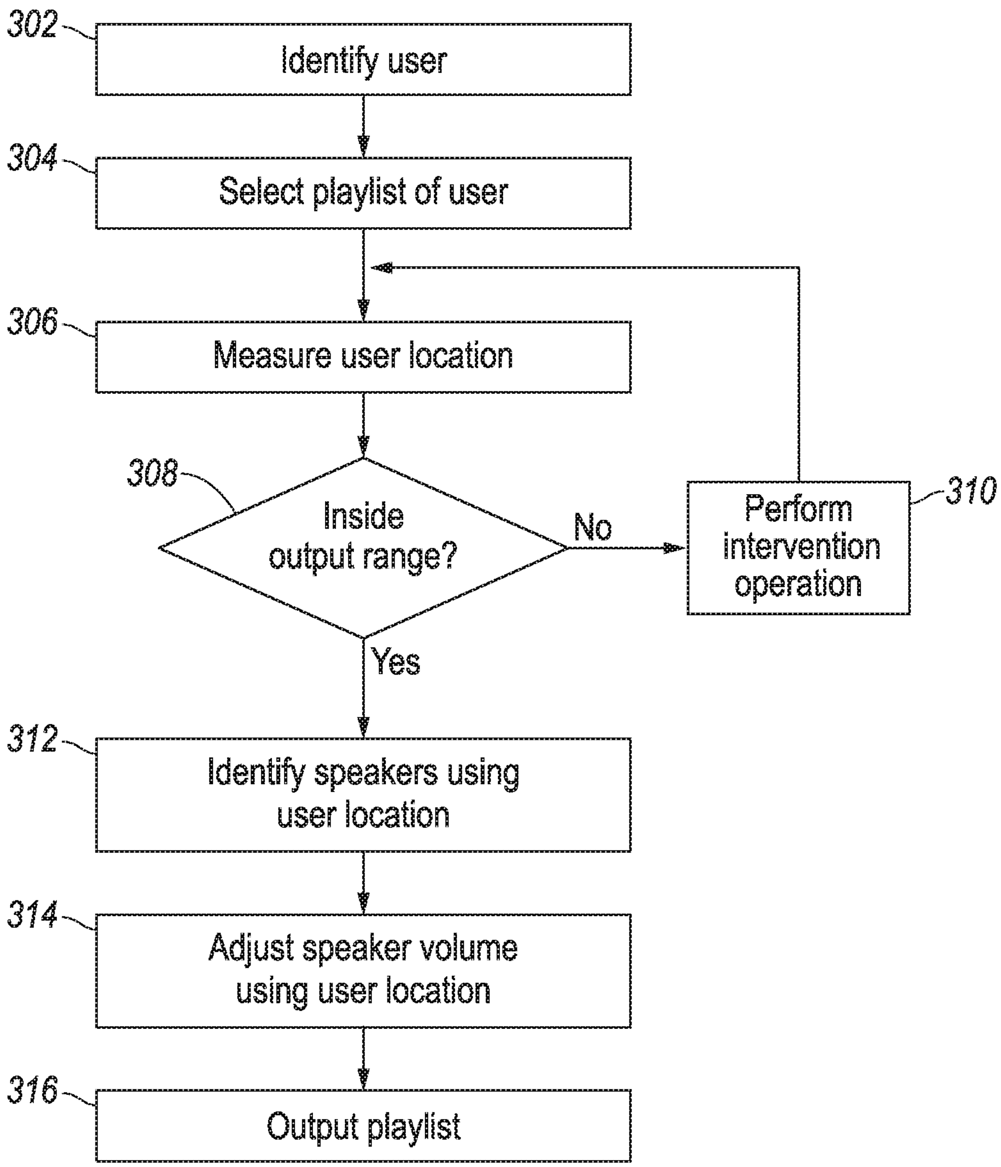
FIG. 3 illustrates an example flow diagram of a process for operating the vehicle audio system of one embodiment of the present disclosure.

Referring to FIG. 3, an example flow diagram of a process 300 for operating the vehicle audio output based on the location of one or more users of one or more embodiments of the present disclosure is illustrated. With continuing reference to FIGS. 1 and 2, the process 300 may be implemented via various components of the vehicle 102. For instance, the process 300 may be individually or collectively implemented via the computing platform 104, one or more ECUs 168, UWB transceivers 186 or the like. For simplicity, the following description will be made with reference to the computing platform 104.

At operation 302, the computing platform 104 identifies one or more vehicle users 202 at the vicinity of the vehicle 102. The user identification operation may be performed in various manners. For instance, the computing platform 104 may determine the user identity using the user profile 127 stored in the associated mobile device 128. Responsive to establishing the one or more wireless connections 204 with the mobile device 128, the computing platform 104 may identify the user identity using the user profile 127 stored therein. Additionally or alternatively, the computing platform 104 may identify the user 202 using the biometric information stored as a part of the user profile 127 in the storage 110. As an example, responsive to capturing a facial image of the user 202 via one or more of the cameras 117, the computing platform 104 may compare the facial image with the biometric information of the user profile 127 such that the identity of the vehicle user may be identified.

In response to identifying the user 202, at operation 304, the computing platform 104 selects one of the audio playlists associated with the user 202 as identified using the user profile 127 in preparation of the audio output. As discussed above, the playlist may include a radio channel and/or a music soundtrack preselected by the user 202. Additionally or alternatively, the playlist may include one or more white noise preselected by the user 202. The white noise may be used for various purposes. For instance, the white noise may be associated with the benefit of promoting relaxation and reducing stress levels of the user 202. The white noise may also increase privacy of the user 202 while engaging a conversation, e.g., the white noise covers up the user speech within the audio output range.

At operation 306, the computing platform 104 measures the location of the user 202 relative to the vehicle 102. As discussed above, the computing platform 104 may locate the user 202 via wireless connection trilateration and/or triangulation through the plurality of UWB transceivers 186 and/or the wireless transceiver 132. Additionally or alternatively, the computing platform 104 may locate the user 202 via the vehicle sensors 184 and/or cameras 117. For instance, the computing platform 104 may use one or more of the lidar sensors 184 and ultrasonic sensors 184 to determine the location of the user 202 relative to the vehicle 102 in addition to or in lieu of using the wireless connections 204. Images captured by the camera 117 may be further used to improve the accuracy of the user location determination. Additionally or alternatively, the computing platform 104 may locate the user 202 via the location information determined via the GNSS controller 146 of the mobile device carried by the user 202. The mobile device 128 may send the location information to the vehicle 102 via the wireless connections 204 and/or the wireless network 172. Once the location of the user 202 is determined, at operation 308, the computing platform 104 determines if the location of the user 202 within the audio output range 212 centered around the vehicle 102.

If the computing platform 104 determines that the user 202 is located outside the audio output range 212, the process proceeds to operation 310, and the computing platform 104 performs intervention operations. The intervention operations may include various examples. For instance, if the audio is currently being played by one or more of the speakers 118, the computing platform 104 may suspend the audio play in response to detecting the user is outside the audio output range 212. This intervention operation may be applicable to an example in which the user 202 walks away from the vehicle 102 while the audio is being played. Additionally or alternatively, the intervention operation may include autonomously operating the vehicle 102 via the ADC 182 to drive toward the user 202 such that the user 202 subsequently become within the audio output range 212. This intervention operation may be applicable to an example that the user 202 walks along a trajectory and the vehicle follows the user 202 as the driving condition allows and continue to play the audio once the user 202 is inside the audio output range 212 again.

If the computing platform 104 determines the user 202 is inside the audio output range 212 at operation 308, the process proceeds to operation 312 and the computing platform 104 identifies the one or more of the speakers 118 to be used for audio outputting using the location of the user 202 as determined. As discussed in the example with reference to FIG. 2, different speakers 118 may be activated to output the audio depending on the relative location of the user 202 with reference to the vehicle 102. As a generally rule, speakers closer to the location of the user 202 (e.g., with shorter distance) may be preferred for audio outputting.

At operation 314, the computing platform 104 adjusts the volume of each of the identified speakers 118 using the location of the user 202. For instance, the volume of each speaker may be adjusted using equation (1) discussed above based on the distance between the location of the user 202 and each respective speaker.

At operation 316, the computing platform 104 outputs the audio associated with the selected playlist via the identified speakers 118 at the adjusted volume. As discussed above, the audio may be a soundtrack preferred by the user 202. Additionally or alternatively, the audio may be a white noise sound focused toward the location of the user 202 for relaxation and privacy purposes.

The operations of the process 300 may be automatically repeated until none of the one or more users 202 is in the audio output range 212.

The operations of the process 300 may be applied to various situations. In one example, there may be two users 202 riding in the vehicle 102 (e.g., a driver and a passenger). While inside the vehicle cabin, the computing platform 104 may output the audio associated with a playlist of one of the users via one or more interior speakers 118. As the vehicle is parked, both users 202 exit the vehicle 102 cabin and the computing platform 104 may switch the audio output from the interior speakers to exterior speakers corresponding to the location of the users 202. For instance, as the driver 202 exits the vehicle 102, the computing platform 104 may continue to output the audio via the first speaker **118*a* and the fourth speaker 118*d* located on the left side (e.g., driver side) using the volume continuously adjusted based on the location of the first user 202. In this case, the first speaker 118*a* being closer to the driver 202 may output the audio at a higher volume compared with the fourth speaker 118*d* being farther from the driver 202** such that the driver experiences a consistent audio output.

As the passenger 202 exists from the rear-right side (e.g., passenger side), the computing platform 104 may continue to output the audio via the second speaker **118*b* and the third speaker 118*c* both located on the right side of the vehicle 102. The second speaker 118*b* being farther from the passenger 202 may output the audio at a lesser volume compared with the third speaker 118*c* being closer to the passenger 202**.

The computing platform 104 may continuously track the locations of both the driver and the passenger 202 and adjusts the speaker volume accordingly until both of the driver and passenger 202 have exited the audio output range 212 at which point the computing platform 104 may suspend the audio output. Upon detecting one or more of the driver and passenger 202 reentering the audio output range 212, the computing platform 104 may resume the audio output of the playlist.

In an alternative example, the multiple user 202 of the vehicle 102 may be associated with different playlists having different audios. E.g., the first user **202*a* may prefer a radio new channel and the second user 202*b* may prefer a music audio. The computing platform 104 may coordinate the playlists and output the different audios simultaneously using different speakers based on the location of each user 202. For instance, the computing platform 104 may detect the first user 202*a* located on the driver side (e.g., left side) outside the vehicle 102 while a second user 202*b* is detected on the passenger side (e.g., right side) of the vehicle 102. Based on the detected location of the users 202, the computing platform 104 may use the first speaker 118*a* and the fourth speaker 118*d* to output the audio associated with the first user 202*a*, and user the second speaker 118*b* and the third speaker 118*c* to output the audio associated with the second user 202*b***.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:

one or more wireless transceivers configured to establish one or more wireless communications with a mobile device;

a plurality of speakers configured to output audio; and
a controller programmed to
measure a first location of a user carrying the mobile device within a predefined range from the vehicle using the one or more wireless communications, wherein the first location is closer to a first speaker of the plurality of speakers than to a second speaker of the plurality of speakers,
adjust volumes of the plurality speakers using the first location of the user such that the volume of the first speaker is higher than the volume of the second speaker, and
responsive to detecting the user has relocated from the first location to a second location that is closer to the second speaker than to the first speaker, reduce the volume of the first speaker and increase the volume of the second speaker, such that the volume of the second speaker is higher than the volume of the first speaker.

2. The vehicle of claim 1, wherein the one or more wireless transceivers include at least three wireless transceivers each configured to establish one of the wireless communications with the mobile device; and
the controller is further programmed to:
measure the location of the user carrying the mobile device by trilaterating the wireless communications.

3. The vehicle of claim 1, wherein the one or more wireless transceivers are located at different locations of the vehicle and configured to support an ultra-wide band (UWB) protocol.

4. The vehicle of claim 1, wherein the controller is further programed to adjust the volume of the one or more speakers such that a sum of volume output via each of the speaker is equal to a total volume.

5. The vehicle of claim 1, wherein the controller is further programmed to:
responsive to detecting the user has relocated to a third location that is beyond a predefined range from the vehicle, suspend outputting the audio.

6. The vehicle of claim 1, wherein the controller is further programmed to:
responsive to detecting the user has relocated to a third location that is beyond a predefined range from the vehicle, autonomously operate the vehicle to drive toward the third location of the user until the location of the user is within the predefined range.

7. The vehicle of claim 1, wherein the controller is further programmed to:
determine an identity of the user using a user profile stored in the mobile device;
select a playlist using the identity of the user; and
play the playlist through the audio.

8. The vehicle of claim 7, further comprising:
one or more cameras, configured to capture images of the user;
wherein the controller is further configured to:
determine the identity of the user using the images.

9. The vehicle of claim 1, further comprising:
one or more sensors, configured to detect the user and generate sensor data;
wherein the controller is further configured to:
measure the location of the user using the sensor data.

10. A method for a vehicle, comprising:
establishing, via a plurality of transceivers, wireless connections with a mobile device;
measuring, via one or more controllers, a first location of the mobile device using the wireless connections through trilateration, wherein the first location is closer to a first speaker of a plurality of speakers exterior to the vehicle than to a second speaker of the plurality of speakers;
adjusting, via the one or more controllers, volumes of a plurality of speakers using the location of the mobile device such the volume of the first speaker is higher than the volume of the second speaker;
outputting, via the plurality of speakers, an audio using the volumes; and
responsive to detecting the user has relocated from the first location to a second location that is closer to the second speaker than to the first speaker, reducing the volume of the first speaker and increasing the volume of the second speaker, such that the volume of the second speaker is higher than the volume of the first speaker.

11. The method of claim 10, wherein the wireless connections are established using ultra-wide band (UWB) protocol.

12. The method of claim 11, wherein at least one of the wireless connections are established using a wireless communication protocol other than UWB.

13. The method of claim 10, wherein the volumes of the plurality of speakers are adjusted such that a sum of volume output via each of the speaker is equal to a total volume set by a user associated with the mobile device, and at least one of the plurality of the speakers is inactive with zero volume.

14. The method of claim 10, further comprising:
responsive to detecting the mobile device has relocated to a third location that is beyond a predefined range from the vehicle, suspend outputting the audio.

15. A non-transitory computer-readable medium, comprising instructions that when executed by a vehicle, cause the vehicle to:
establish a plurality of wireless connections with a first mobile device, wherein at least one of the wireless connections is under an ultra-wide band (UWB) protocol;
measure a first location of the first mobile device exterior to the vehicle by trilaterating the plurality of wireless connections, wherein the first location is closer to a first speaker of a plurality of speakers exterior to the vehicle than to a second speaker of the plurality of speakers;
adjust volumes of a first set of a plurality of speakers including the first speaker and the second speaker using the first location of the first mobile device such that the volume of the first speaker is higher than the volume of the second speaker;
output a first audio of a playlist at the volumes via the first set, wherein the first audio includes a white noise; and
responsive to detecting the user has relocated from the first location to a second location that is closer to the second speaker than to the first speaker, reduce the volume of the first speaker and increase the volume of the second speaker, such that the volume of the second speaker is higher than the volume of the first speaker.

16. The non-transitory computer-readable medium of claim 15, further comprising instruction when executed by a vehicle, cause the vehicle to:
responsive to detecting the first mobile device has relocated to a third location that is beyond a predefined range from the vehicle, autonomously operate the vehicle to drive toward the first location of the first mobile device.

17. The non-transitory computer-readable medium of claim 15, further comprising instruction when executed by a vehicle, cause the vehicle to:

responsive to establishing a plurality of wireless connections with a second mobile device, measure a second location of the second mobile device; and output a second audio different from the first audio via a second set of the plurality of speakers, wherein the second set includes at least one speaker that is not included in the first set.

* * * * *